United States Patent
Supernaw

[11] 3,714,917
[45] Feb. 6, 1973

[54] APPARATUS FOR STEERING A TORPEDO

[75] Inventor: Dwight L. Supernaw, Baltimore, Md.

[73] Assignee: The United States of America as represented by the Secretary of the Navy

[22] Filed: July 7, 1960

[21] Appl. No.: 41,461

[52] U.S. Cl. .................................... 114/20, 114/24
[51] Int. Cl. ...................... F42b 19/01, F42b 19/06
[58] Field of Search ............. 114/23, 21.1, 20, 24, 25; 244/14.3, 14, 14.4; 318/16

[56] References Cited

UNITED STATES PATENTS

| | | | |
|---|---|---|---|
| 2,557,401 | 6/1951 | Agins et al. | 244/14 |
| 2,889,796 | 6/1959 | Williams et al. | 114/20 |
| 3,020,537 | 2/1962 | Schriefer | 244/14 |
| 2,662,207 | 12/1953 | Hollister | 114/23 |

Primary Examiner—Samuel Feinberg
Assistant Examiner—James M. Hanley
Attorney—W. O. Quesenberry and V. C. Muller

EXEMPLARY CLAIM

1. In a homing torpedo having
   a. a rigid elongated body having an outer shell and having front and rear ends,
   b. a directional transducer having an axis of directionality, said transducer being disposed within said shell and rotatably carried by the rigid body adjacent its front end,
   c. means forming an acoustic window in the frontal surface of the outer shell of the torpedo operatively associated with the transducer to transmit and receive acoustic signals,
   d. means operatively associated with said transducer for sending an acoustic signal to a target,
   e. means operatively associated with said transducer for receiving an echo-signal returned form the target and for producing an error signal corresponding to the deviation between target and the axis of directionality,
   f. steering means controlled by said error signal to change the torpedo heading in a direction tending to restore alignment of the target and the axis of directionality of the transducer, the improvements, in combination, comprising;
   g. means supporting said transducer for rotation solely about a vertical axis of rotation,
   h. means rigidly coupled to the torpedo body for sensing the angular velocity at which the torpedo heading changes and for producing a transducer turning signal having an amplitude and signal polarity corresponding to the magnitude and angular direction of said angular velocity, and operable independent of movement of said transducer,
   i. a reversible motor drivingly connected to said transducer to turn same about said axis of rotation,
   j. and control means connected to operate said reversible motor, said control means being responsive to said transducer turning signal to turn the transducer in an angular direction opposite to the angular direction in which the torpedo heading changes and at an angular velocity proportional to and slower than the angular velocity of heading change.

4 Claims, 3 Drawing Figures

PATENTED JAN 6 1973
3,714,917
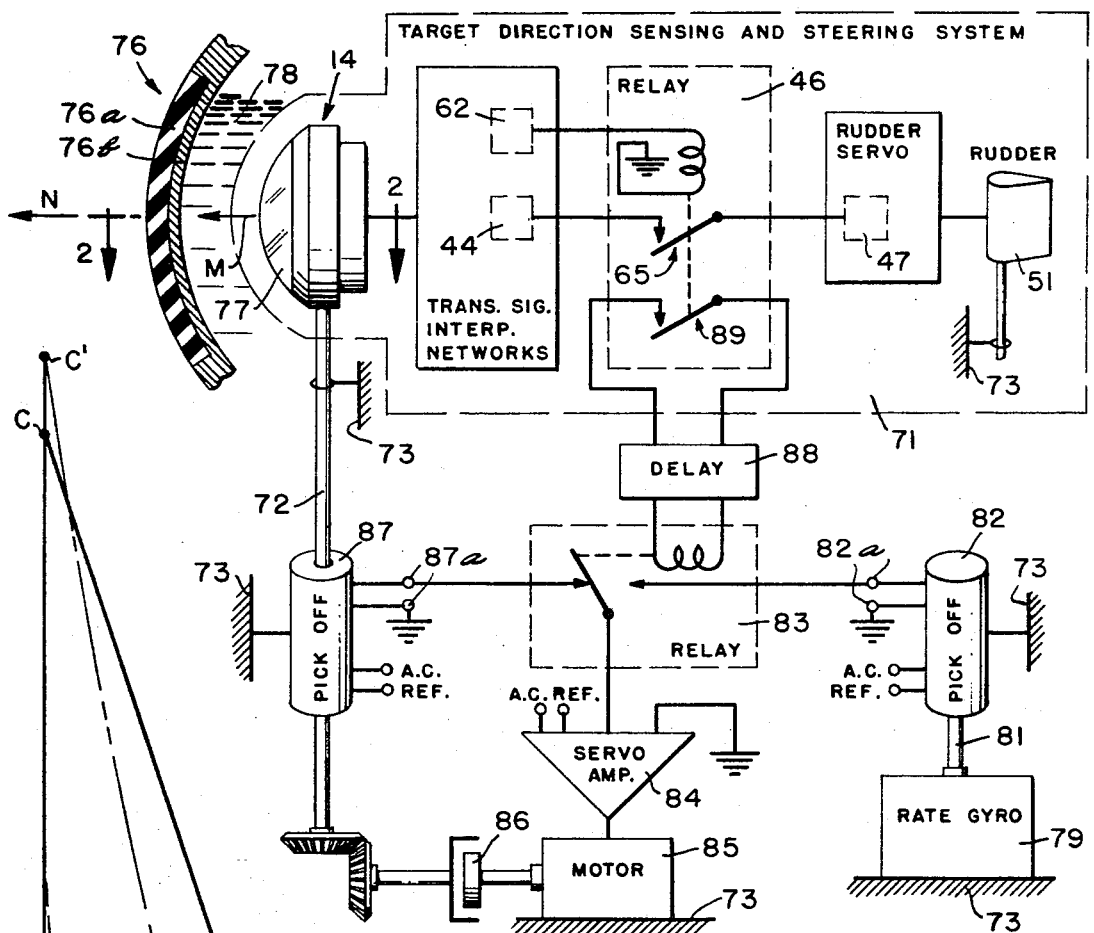
FIG. 1.
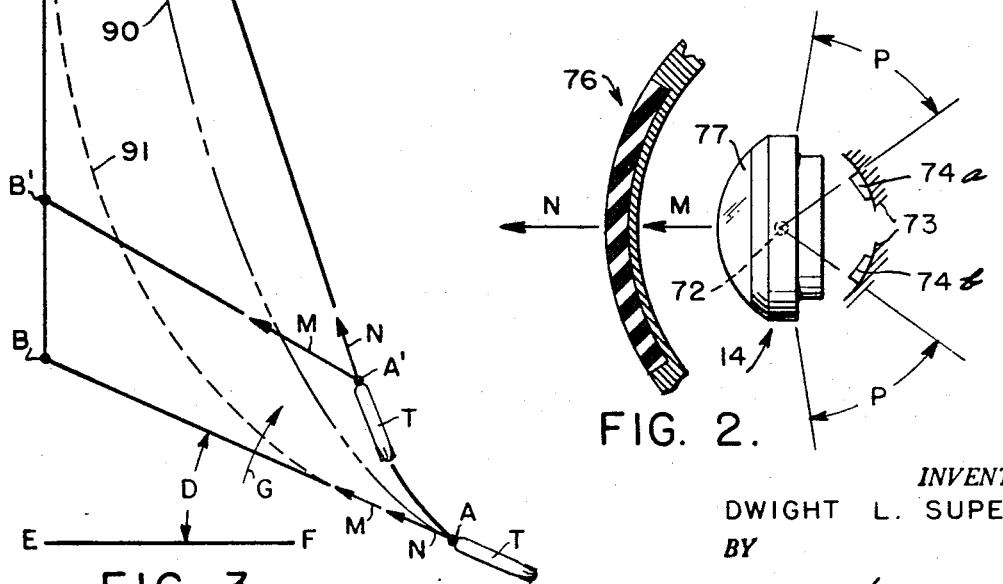
FIG. 2.
FIG. 3.
INVENTOR.
DWIGHT L. SUPERNAW
BY
*V.C. Muller*
ATTORNEYS.

APPARATUS FOR STEERING A TORPEDO

This invention relates to steering control apparatus for homing torpedoes and more particularly to improvements in steering control apparatus of the type which steers the torpedo by continuously correcting its course to maintain the reference axis of a target sensing device, such as a transducer or hydrophone, directed at the target.

In apparatus of the type referred to, the reference axis of the sensing element is commonly fixed in alignment along the longitudinal axis of the torpedo. It is well known that such arrangement provides an attack trajectory such that the direction of motion of the torpedo is always directed at the target, to be hereinafter referred to an an ordinary pursuit course. The ordinary pursuit course is not entirely satisfactory for a number of reasons. For example, it is somewhat indirect and therefore requires a longer run to hit a target. Also, in some instances the ordinary pursuit course becomes substantially curved as the torpedo nears the target, exceeding the maneuverability capabilities of the torpedo and resulting in a miss. Also, in some instances even though the torpedo is launched ahead of a moving target, the torpedo is steered through a broad arc bringing it to a position where it must approach the target from the stern, requiring a "stern chase," and resulting in all its well known disadvantages.

An object of the present invention is to provide methods and means for obtaining a more nearly optimum attack trajectory with steering control apparatus of the type referred to.

Another object is to provide apparatus in accordance with the preceding object which has special utility for modifying existing steering control equipment.

Other objects and many of the attendant advantages of this invention will be readily appreciated as the same becomes better understood by reference to the following detailed description when considered in connection with the accompanying drawings wherein:

FIG. 1 is a schematic drawing of the apparatus of the present invention;

FIG. 2 is a section taken along line 2—2, FIG. 1; and

FIG. 3 is a diagram illustrating attack trajectories obtainable with the apparatus of FIG. 1.

Referring to the drawing and in particular to FIG. 1, the apparatus of the present invention comprises any suitable target sensing and steering system of the type which employs a sensing device such as a hydrophone or transducer for sensing target direction relative to a reference axis associated with the sensing device, and which is adapted to continuously or substantially continuously correct the torpedo course to maintain the reference axis directed at the target. Steering system 71, which is exemplary of such type is as disclosed in co-pending application Ser. No. 240,213 of Harvey Brooks, filed Aug. 3, 1951, and the components shown therein are assigned the same reference characters as in FIG. 1 through 3 of the aforementioned application. Briefly, in system 71 a transducer 14 and an associated transducer signal interpretation network are adapted to detect deflection of the target in azimuth relative to transducer axis M and to provide suitable azimuth steering command signals at the output of a detector 44. Provided that relay 46 is energized, the output of the azimuth detector 44 is fed to an input amplifier 47 of a rudder servo and system 71 operates to steer the torpedo to the target by continuously correcting its course to maintain axis M directed at the target. Prior to energizing relay 46 and as described in the aforesaid application, the rudder servo is employed otherwise than to steer the torpedo in accordance with the target deflection, and when transducer 14 and its associated network senses a target of sufficient intensity to provide an adequate steering command an amplifier 62 energizes relay 46, as is typical of all apparatus of this type. In accordance with the present invention transducer 14 is carried by a shaft 72 which is pivotally mounted to the torpedo body 73 for rotation in azimuth. Transducer 14 is preferably limited in rotation between limit stops 74a, 74b, FIG. 2, permitting the transducer to rotate from a position with transducer axis M aligned along torpedo axis N through an equal angle P, less than 90° in either of opposite directions of rotation. The choice of this angle is a compromise between permitting the transducer to rotate through larger angles, and thereby permitting the torpedo to follow a collision course in more situations, as will hereinafter be apparent in the description of operation, and the likelihood of erratic operation of system 71 at such larger angles, which erratic operation may be caused by distortions in the transmission and reception of sonic energy through the torpedo shell or by self-noise of the torpedo. To provide a satisfactory acoustic match between the transducer and the ocean medium through which the torpedo travels, the torpedo is provided with a nose assembly 76 comprising a rubber outer surface 76a with a metal backing 76b, and the space between sound projecting and the receiving surface 77 of the transducer and nose assembly 76 is filled with a fluid medium 78 having acoustical properties similar to sea water, such as castor oil. A conventional rate gyro 79 is mounted to torpedo body 73 with its spin axis so oriented that the angular position of its output shaft 81 varies in accordance with sense of direction and angular speed of azimuthal turning of the torpedo, or using somewhat more mathematical language, or azimuthal angular movement of the torpedo. A well known type of gyro for measuring rate of angular movement about a given axis has a two degree of freedom gimbal type frame supporting the rotor for free rotation about a spin axis orthogonally related to the axis of the rate measurement, and providing pivotal support about a pivot axis orthogonally related to both the axis of the rate measurement and the spin axis, with the gyro resiliently restrained to an equilibrium position about the latter pivot axis. In operation, the deflection of the gyro from its equilibrium about the pivot axis having the restraint arrangement is a measure of the rate of angular movement of the gyro about the axis of measurement. In order to provide an output, the gimbal providing the support about the pivot axis having the restraint arrangement may have a trunnion shaft aligned along such pivot axis, which trunnion shaft would correspond to shaft 81 of gyro 79. In the instance in which a rate gyro of this type is used the two degree of freedom gimbal frame would be so oriented that the axis about which angular rate is measured is aligned along a vertical axis passing through the torpedo body and the gimbal frame would be rigidly affixed to the torpedo body. Thus the angular movement of gyro frame would be essentially in unison with changes in torpedo heading, and the angular position of shaft 81 would represent the rate of change of heading. A suitable electrical rotor position pick-off device 82, such as a microsyn pick-off, having its rotor connected to shaft 81 and its stator stationary relative to the torpedo body generates an electrical signal in accordance with the rate gyro output at its output terminals 82a. Provided that a relay 83, to be hereinafter more fully described, is energized, the signal output of sensing device 82 is fed to a servo amplifier 84, which in turn energizes a reversible motor 85 that is drivingly connected to shaft 72 through a slip clutch 86. Pick-off device 82, servo amplifier 84 and reversible motor 85 constitute a servomechanism so selected and arranged to rotate transducer 14 simultaneously to the occurrence of turning of the torpedo, but in an opposite sense of direction and at a slower angular speed, or using somewhat more mathematical language, to rotate transducer 14 in proportion to the angular velocity of the torpedo with a negative constant of proportionality having an absolute value less than one.

For reasons which hereinafter will be made apparent in the description of the operation, there is preferably provided an arrangement for initially maintaining transducer axis M aligned along torpedo axis N and delaying the start of rotation of transducer 14. Such arrangement comprises an electrical rotor position pick-off device 87, like device 82, with its rotor connected to shaft 72 and its stator secured to the torpedo body which is adapted to generate an output signal at its output terminals 87a in accordance with the deviation of transducer axis M from torpedo axis N. Provided that relay 83 is in its de-energized condition, the output signal of sensing device 87 is fed to servo amplifier 84. When thusly connected, pick-off device 87, servo amplifier 84 and reversible motor 85 constitute a feedback type servomechanism chosen and arranged to maintain transducer axis M aligned with torpedo axis N. Relay 83 is initially in its de-energized condition with its energizing coil responsive to a suitable delay circuit 88, which in turn is actuated by a contact 89 of relay 46 upon the start of operation of system 71 to steer in response to target deflection.

A torpedo having apparatus in accordance with the invention operates as follows:

The torpedo is launched and directed toward the vicinity of a suspected target in any suitable manner and when transducer 14 and the associated network sense a target of sufficient intensity to provide adequate steering commands the output of amplifier 62 energizes relay 46 marking the start of steering control in response to target deflection. Energizing relay 46 also actuates delay circuit 88 through contacts 89. Relay 83 is initially de-energized so that the output of pick-off device 87 is fed to servo amplifier 84 and transducer axis M is maintained in alignment with torpedo axis N. Accordingly, steering system 71 is first operated with transducer axis M aligned along torpedo axis N and in accordance with the discussion of the prior art the torpedo is steered along an ordinary pursuit course. Delay circuit 88 is so chosen to maintain relay 83 de-energized for a sufficient period of time to permit the torpedo to be brought to a course with its direction of motion directly at the target by the ordinary pursuit course mode of steering, which may typically be in the order of several seconds, whereas if transducer 14 were permitted to rotate in accordance with the output of the rate gyro at the commencement of steering in response to target deflection, it would in some instances take many times this period of time for the torpedo to initially turn. Upon lapse of the period of delay circuit 88, relay 83 is energized and the output of pick-off 82 is fed to servo amplifier 84 enabling operation of the servo-mechanism for rotating the transducer in accordance with rate gyro 79. It will now be assumed that a torpedo T is at position A, FIG. 3, at the instant its relay 83 is energized, with its direction of motion directly toward a target at position B, which target is traveling along course BC at a constant velocity. As the target proceeds angle D between a line AB joining the instantaneous positions of the torpedo and the target and a fixed reference direction EF increases. Steering system 71 steers the torpedo to turn in the direction of arrow G tending to maintain transducer axis M directed at the target. Simultaneously, rate gyro 79 senses such turning and generates an output which rotates the transducer relative to the torpedo body in a direction opposite to arrow G and at a slower angular speed. The net effect of this simultaneous relative movement is that the transducer axis M tends to be maintained aligned along the instantaneous position of line AB and that the torpedo axis N turns in the direction of arrow G until the direction of motion of the torpedo is such that angle D is no longer changing. This condition is realized when at position A' the torpedo is brought to the well known collision course which exists in connection with two constant velocity vehicles moving along straight lines. It is a characteristic of the invention that the turn from position A to A' is rapid, taking only several seconds. Subject only to the slight weaving inherent to continuous correction steering control, the torpedo continues along the collision course hitting the target at point C.

In the event limit stops 74 do not permit a sufficient displacement between axes M and N to allow a collision course, reversible motor 85 drives transducer 14 against the limit stop and thereafter causes slippage at clutch 86 and system 71 steers the torpedo to maintain axis M aligned along instantaneous positions of line AB with the direction of motion of the torpedo biased toward a collision course but limited to angle P. This results in an attack trajectory approximating a collision as shown by broken line curve 90, FIG. 3, which represents the course followed by a torpedo started at point A under the same conditions heretofore assumed, except that its limit stop angle P is equal to 30°.

In the event the target maneuvers or changes speed, the apparatus will adjust itself to changes in angle D, steering the torpedo along a trajectory which in all instances is more direct than the ordinary pursuit course. The ordinary pursuit course for a torpedo proceeding from point B is shown in dashed lines 91 for purposes of comparison.

Obviously many modifications and variations of the present invention are possible in the light of the above teachings. It is therefore to be understood that within the scope of the appended claims the invention may be practiced otherwise than as specifically described.

What is claimed is:

1. In a homing torpedo having a. a rigid elongated body having an outer shell and having front and rear ends,
b. a directional transducer having an axis of directionality, said transducer being disposed within said shell and rotatably carried by the rigid body adjacent its front end,
c. means forming an acoustic window in the frontal surface of the outer shell of the torpedo operatively associated with the transducer to transmit and receive acoustic signals,
d. means operatively associated with said transducer for sending an acoustic signal to a target,
e. means operatively associated with said transducer for receiving an echo-signal returned from the target and for producing an error signal corresponding to the deviation between target and the axis of directionality,
f. steering means controlled by said error signal to change the torpedo heading in a direction tending to restore alignment of the target and the axis of directionality of the transducer, the improvements, in combination, comprising;
g. means supporting said transducer for rotation solely about a vertical axis of rotation,
h. means rigidly coupled to the torpedo body for sensing the angular velocity at which the torpedo heading changes and for producing a transducer turning signal having an amplitude and signal polarity corresponding to the magnitude and angular direction of said angular velocity, and operable independent of movement of said transducer,
i. a reversible motor drivingly connected to said transducer to turn same about said axis of rotation,
j. and control means connected to operate said reversible motor, said control means being responsive to said transducer turning signal to turn the transducer in an angular direction opposite to the angular direction in which the torpedo heading changes and at an angular velocity proportional to and slower than the angular velocity of heading change.

2. A torpedo in accordance with claim 1, said means for sensing the angular velocity at which the torpedo heading changes comprising,
k. a rate of angular movement sensing gyro of the type having a gimbal frame adapted to provide a rotor spin axis orthogonally related to a reference axis about which angular velocity is sensed and resiliently restrained in angular movement about a pivot axis orthogonally related to the reference and spin axes, said gimbal frame being rigidly coupled to the body of the torpedo with reference axis in alignment with a vertical axis passing through the torpedo.

3. A torpedo in accordance with claim 1, including
k. limit stop means associated with said transducer to limit the angular movement of the axis of directionality of the transducer in each of the lateral directions away from the longitudinal axis of the torpedo to angles at which the transmitted and received signals may pass between the torpedo and the target through the acoustic window in the frontal surface of the torpedo,
said reversible motor being drivingly connected to the transducer through a slip clutch.

4. A torpedo in accordance with claim 1,
k. said transducer adapted to have its axis of directionality in alignment with the longitudinal axis of the torpedo at the start of control of said steering means in response to said error signal, and
l. time-delay actuated switching means for holding the axis of directionality aligned with the longitudinal axis of the torpedo for a predetermined time after said steering means has been rendered responsive to the error signal.

* * * * *